Patented Nov. 10, 1953

2,658,917

UNITED STATES PATENT OFFICE 2,658,917

PREPARATION OF GUANIDINE THIOCYANATE

Nat H. Marsh, Noroton Heights, Conn., assignor to American Cyanamid Company, New York, N. Y., a corporation of Maine No Drawing. Application November 14, 1949, Serial No. 127,255

1 Claim. (Cl. 260—564)

This invention relates to the synthesis of guanidine values by reacting carbon oxysulfide with ammonia.

It is an object of the present invention to prepare guanidine values using inexpensive raw materials. (By "guanidine values" is meant guanidine in combined form.) Additional objects will be apparent from the discussion hereinafter.

The following example illustrates without limiting the invention.

Example

Into a 300-cc. rocker type autoclave there is introduced 100 g. of carbon oxysulfide and 26 g. of ammonia from their respective transfer bombs. The autoclave is then sealed and heated to a temperature of 250° C. under the autogenously developed pressure for four hours. At the end of this period the vessel is cooled, the pressure released, and guanidine values (present as the thiocyanate) extracted by the following procedure. The reaction mass is first extracted with alcohol to remove alcohol soluble materials. The residue is then extracted with cold water and filtered if necessary to remove melamine and other insolubles. The filtrate contains guanidine thiocyanate as well as ammonium thiocyanate, and the guanidine may be precipitated as the sparingly soluble nitrate by the addition of a soluble nitrate, such as ammonium nitrate.

While a wide range is permissible in the ratio of reactants, it is preferred that the carbon oxysulfide:ammonia mol ratio be at least 1:2. The reaction temperature is not limited to 250° C. but may fall within the range 210°–450° C. The process can be conducted under pressures other than those autogenously produced in a batch process, in which event the pressure range suitable is 200–20,000 p. s. i. The reaction time suitable will vary with the temperature and pressure, and will, of course, be preferably reduced under conditions of high temperature and pressure but lengthened under conditions of low temperature and low pressure. At a temperature and pressure of 220° C. and 1000 p. s. i., the preferred reaction period is about 360 minutes. At high conditions of temperature and pressure, such as 400° C. and 2000 p. s. i., the reaction period may be reduced to 45 minutes and even less.

The preferred temperature range is 240°–260° C., and the preferred pressure range is 1000–2000 p. s. i.

While the invention has been described with particular reference to specific embodiments, it is to be understood that it is not to be limited thereto but is to be construed broadly and restricted solely by the scope of the appended claim.

I claim:

The method of preparing guanidine thiocyanate which includes the steps of heating carbon oxysulfide and ammonia in a closed reaction zone at a temperature within the range 240° to 260° C. and at a pressure within the range 1000 to 2000 p. s. i.

NAT H. MARSH.

References Cited in the file of this patent

UNITED STATES PATENTS

| Number | Name | Date |
|---|---|---|
| 1,808,465 | Klemenc et al. | June 2, 1931 |
| 2,557,986 | Marsh | June 26, 1951 |

FOREIGN PATENTS

| Number | Country | Date |
|---|---|---|
| 579,567 | Germany | June 29, 1933 |

OTHER REFERENCES

Chemical Abstracts, vol. 43 (1949), p. 2946 (abstract of Marecek, "Chem. Abzor," vol. 23 (1948), pp. 217–221).

Klemenc: "Zeit Elektrochemie," vol. 36 (1930), pp. 801 and 802.